Patented Jan. 20, 1953

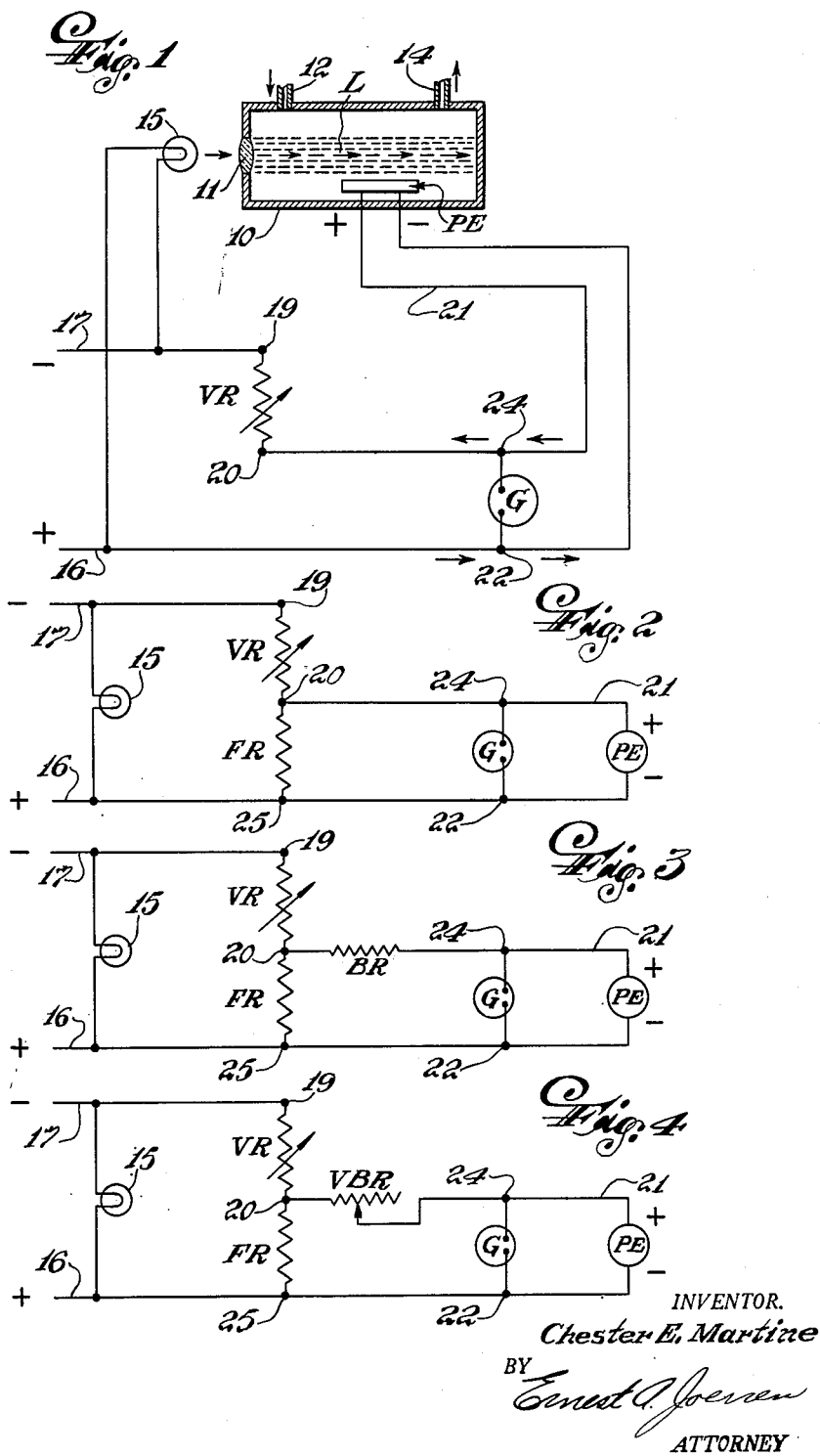

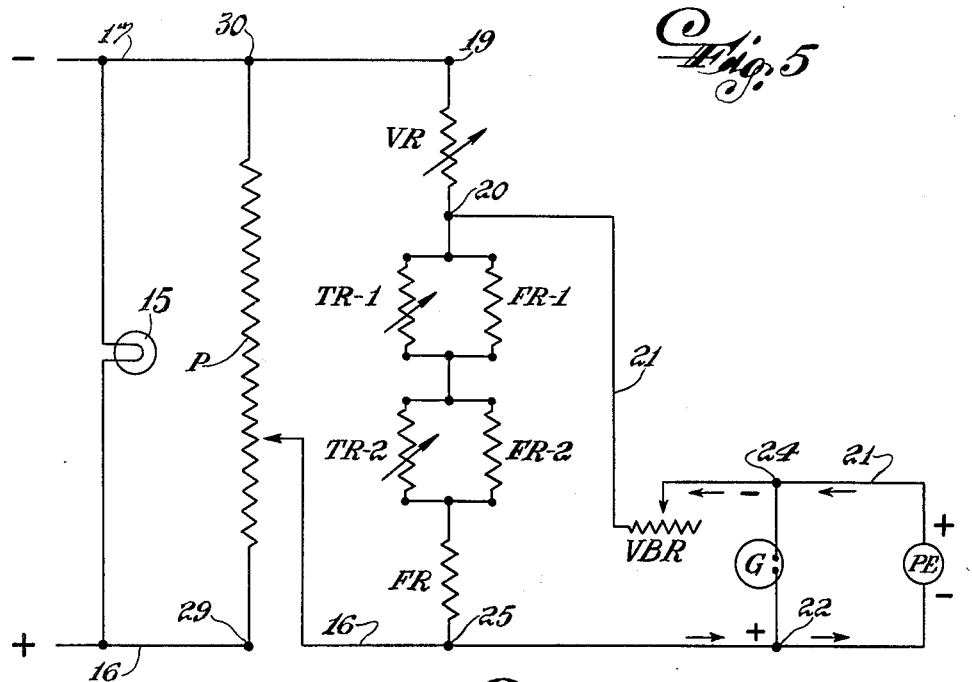
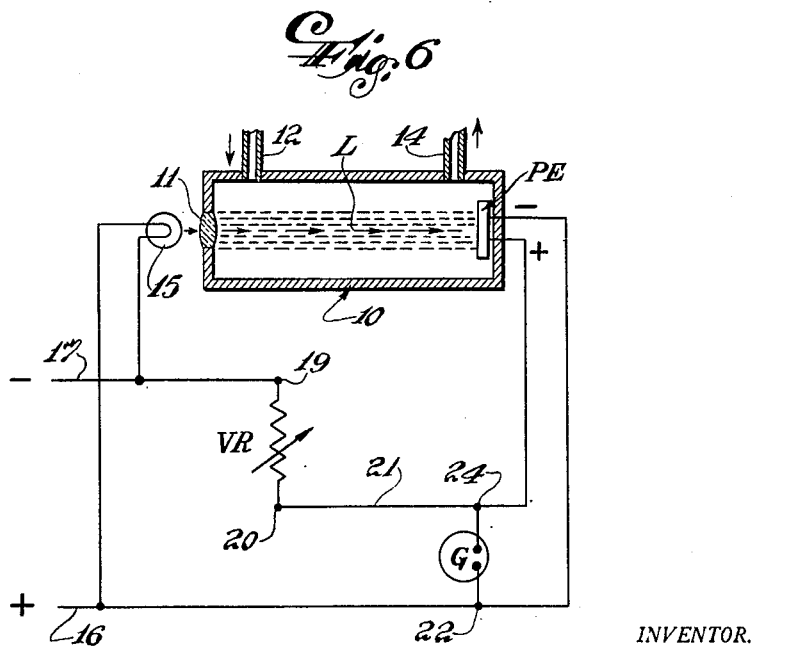

2,626,361

UNITED STATES PATENT OFFICE 2,626,361

APPARATUS FOR DETECTING SUSPENDED MATTER IN FLUIDS

Chester E. Martine, Teaneck, N. J., assignor to Specialties Development Corporation, Belleville, N. J., a corporation of New Jersey Application September 22, 1950, Serial No. 186,129

10 Claims. (Cl. 250—218)

The present invention relates to improvements in apparatus of the light responsive type for detecting and indicating the presence or absence of foreign matter in fluid, such as smoke or dust in air or other gases, solid particles in liquid, or turbidity or coloring matter in liquids.

Heretofore, it has been customary to detect matter in fluid by utilizing apparatus generally comprising a source of electrical energy, a light source connected across the energy source for providing a beam of light, means for conducting a stream of fluid into the light beam, a photoelectric element located with respect to the light beam and the fluid stream to detect matter in the fluid stream, and electro-responsive means for giving an indication or for actuating elements associated with the apparatus upon the detection of matter in the fluid.

Because of sudden and extreme variations in the supply voltage of the energy source, particularly where such apparatus was installed on shipboard or other craft, it has been customary to utilize what is known as a balanced system wherein two photoelectric elements or cells were so arranged in a circuit that variations in the output of one due to voltage changes were compensated for by the other. This required that the cells must match perfectly throughout their useful life. Such matching of cells has been practically impossible to attain, primarily because of the inability to manufacture matching cells in quantities and because of the inherently unpredictable behavior of the cells during use.

Accordingly, an object of the present invention is to provide improved apparatus of the character indicated herein which overcomes the foregoing difficulties.

Another object is to provide such apparatus which is simple, compact and economical in construction and which is reliable in operation in spite of wide variations in the supply voltage.

Another object is to provide such apparatus which is equally well adapted for detecting matter in fluid by either the reflection or the obscurement method.

A further object is to provide such apparatus which is readily adjustable to fulfill a great variety of requirements and conditions.

A still further object is to provide such apparatus which is not adversely affected by severe changes in temperature.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are accomplished by providing apparatus which comprises in combination a source of electrical energy, a light source connected across the energy source for providing a beam of light, means for conducting a stream of fluid into the light beam, a photoelectric element located with respect to the light beam and the fluid stream to detect matter in the fluid stream, a varistor element and electro-responsive means connected in a circuit with the source of energy and the photoelectric elements in predetermined relation and arrangement so that the electro-responsive means normally is inactive but will respond to the presence of matter to be detected in the fluid stream. Suitable resistances may be utilized to so balance the circuit, and these resistances may be fixed and/or adjustably variable to effect such balancing. Where the apparatus is to be subjected to a wide range of temperatures, provision is made for maintaining the circuit in balance by utilizing thermistor elements and fixed resistances which are operatively associated in the circuit in the manner described hereinafter.

The term "thermistor" is descriptive of a thermally sensitive electrical resistor, and the term "varistor" is descriptive of a non-ohmic solid conductor used as a variable resistor. The construction, characteristics and uses of thermistors and varistors are described in a booklet entitled "Varistors," compiled of a group of articles reprinted from Bell Laboratories Record, Western Electric Company, Radio Division, 1946, thirty-two pages.

In the drawings:

Figure 1 is a schematic view of apparatus in accordance with the invention including a wiring diagram illustrating one form of circuit, the light beam and the photoelectric element being arranged for detecting matter in the fluid stream by reflection.

Figures 2, 3 and 4 are wiring circuit diagrams illustrating modifications of the circuit shown in Figure 1.

Figure 5 is a circuit diagram illustrating a circuit which is self-compensating for ambient temperature changes.

Figure 6 is a schematic view, similar to Figure 1, wherein the light beam and photoelectric element are arranged for detecting matter in the fluid stream by obscurement of the light beam.

Referring to the drawings in detail, and more particularly to Figure 1 thereof, there is shown apparatus for detecting and indicating the presence or absence of matter in fluid. The apparatus comprises a casing or housing 10 having a window 11 and an inlet 12 and an outlet 14 for circulating a stream of the fluid to be tested for matter therein; a light source, such as an incandescent lamp 15 connected across the terminals of a source of direct current electrical energy herein indicated by the conductors 16 and 17, for directing a light beam L through the window 11 and into which beam the fluid is conducted; and a photoelectric element PE, such as a barrier-layer cell, a photoelectric tube or the like, located in the casing 10 with respect to the light beam and the fluid stream to respond to light reflected from the matter in the fluid stream, the photoelectric element being laterally adjacent the light beam but out of the path thereof.

This type of apparatus is particularly adaptable for detecting the presence of suspended matter such as smoke in air withdrawn from compartments, spaces or vaults in ships, aircraft or warehouses to detect the presence of smoke caused by fire, but is equally well adaptable for detecting the absence of solid particles in liquid or gaseous fluids or for detecting other changes in the characteristics of fluids.

In apparatus of this type, some stray light from the beam L will always reach the light sensitive surface of the photoelectric element (hereinafter referred to as the cell for brevity), and the voltage across the lamp from the energy source may vary suddenly and considerably. Since the light output of the lamp varies as the third to fourth exponential power of the lamp voltage, a change of only a few volts of the lamp voltage can produce a change in the cell output sufficient to give a signal equivalent to that desired to be produced by a change in the condition of the fluid stream sought to be detected. In order to greatly minimize and practically eliminate this contingency, a varistor element VR is provided which has one terminal thereof connected to the negative conductor 17 at 19 and has its other terminal connected at 20 to the positive terminal of the cell by a conductor 21. The negative terminal of the cell is connected to the positive conductor 16; and an electroresponsive device, such as a galvanometer or relay G, is connected across the terminals of the cell by connections 22 and 24 to the conductors 16 and 21, respectively.

The varistor element is a form of resistor characterized in that the current passing therethrough varies as a power of the voltage applied, that is, $I = KE^n$, where I is the current, E is the voltage, K is a constant depending on the resistivity and dimensions of the varistor element and $n$ is a constant having a value of about 4. Thus, when the supply voltage varies, the cell current generated by stray light of the beam and the varistor element current vary approximately in the same manner, it being understood that the circuit is balanced when the fluid stream is in its normal condition whereby substantially equal and opposite currents pass through the electro-responsive device and this device remains inactive.

However, when the condition of the fluid stream changes and light is reflected therefrom to the cell, the output of the cell current will be greater than the current passing through the varistor element whereby current will flow through the electro-responsive device to actuate the same. The electro-responsive device may be utilized to give a visual indication or effect actuation of a visual or audible alarm or actuation of other apparatus or mechanism designed to eliminate or correct the condition indicated by the fluid stream.

In Figure 2, a circuit is shown which is essentially the same as that shown in Figure 1, except that a fixed resistance element FR is connected between the varistor terminal 20 and the conductor 16 at 25. The value of the resistance of this element is small compared to that of the varistor so that almost all of the lamp voltage appears across the varistor. The fixed resistance element FR tends to slightly reduce the effective value of $n$, so that the varistor current varies more approximately as the light produced by the lamp varies with the lamp voltage. For example, if the light output of the lamp varies as the 3.5 exponential power of the applied lamp voltage, the varistor current can be adjusted in this manner to vary as the 3.5 exponential power of the lamp voltage. Thus, the cell current and the varistor current vary in the same manner with respect to the lamp voltage.

Usually, a current of only between about 5 to 35 microamperes is required to balance out the cell current, whereas the current output of generally available varistors may be about 5 milliamperes. Hence, the fixed resistance element has a value to allow only that small portion of the varistor current required to balance the cell current to pass to the galvanometer G.

In Figure 3, a circuit is shown which is essentially the same as that shown in Figure 2, except that a fixed resistance element BR is connected in the conductor 21 between the galvanometer G and the varistor terminal 20. This element serves as a balancing resistor whereby the portion of the varistor current which is effective on the galvanometer matches the cell current so that the galvanometer current is zero while the fluid stream is in its normal condition.

In Figure 4, a circuit is shown which is essentially the same as that shown in Figure 3, except that a variable balancing resistance element VBR is provided. This element permits accurate adjustments to made made in balancing the varistor and cell current. Such adjustments are very desirable to compensate for slight changes of the cell output during the useful life thereof, whereby the sensitivity of the apparatus can be maintained.

In Figure 5, a circuit is shown which is based on the circuit shown in Figure 4, but it will be appreciated that the circuits shown in Figures 2 and 3 may be similarly modified. In this circuit, provision is made for offsetting variations in the current output of the varistor due to substantial temperature changes. For example, if the apparatus in accordance with the present invention is used on aircraft, the ambient temperature to which the varistor is subjected may vary from −70° F. to 140° F. Since varistor elements have a temperature characteristic whereby the current varies approximately linearly with the ambient temperature, the current-voltage relationship is not changed but the current at a given voltage is changed so that the cell current is no longer balanced out.

This temperature effect can be compensated by substituting for the fixed resistance element FR a network of thermistors and fixed resistors so selected and arranged that the resistance of the network changes inversely at the same rate as the current output of the varistor changes to thereby maintain the circuit in balance at any desired temperature within a given range at any voltage across the lamp.

As shown herein, such a network comprises a pair of thermistor elements TR-1 and TR-2 and a fixed resistance element FR connected in series between the varistor terminal 20 and the conductor 16 at 25, and fixed resistance elements FR-1 and FR-2 shunted across the terminals of the thermistors TR-1 and TR-2. While two sets of such thermistors and resistors are illustrated by way of example, it will be understood that any suitable number of such sets may be utilized depending on the extent of the temperature range to which the apparatus will be subjected. For example, where the temperature may vary only twenty or thirty degrees, one thermistor and resistor set is sufficient to counteract the temperature changes. Similarly, where the temperature range is extreme, more than two such sets are required to maintain the circuit in balance.

In the illustrative network, the fixed resistors FR-1 and FR-2 have approximately the same resistance, and the thermistor TR-1, at a temperature of about 77° F., has a resistance about twenty times that of the thermistor TR-2. The thermistor TR-2 and the resistor FR-2 control the rate of change of the resistance of the entire network at temperatures below 77° F., but have relatively little effect at temperatures above 77° F. Correspondingly, the thermistor TR-1 and the resistor FR-1 control the rate of change of the resistance of the entire network above 77° F., but have comparatively little effect at temperatures below 77° F. The fixed resistor FR is of a value required to properly modify the rate of change of the combined resistances of the thermistor and resistor sets throughout the full temperature range. The variable resistance element VBR serves to accurately balance the applied current against the cell current.

The circuits illustrated herein may be designed to operate on a minimum voltage required for a lamp which will provide a light beam of sufficient intensity, for example, twenty volts. If the apparatus is to be used in installations where the lamp supply voltage is of a greater value, for example, eighty volts, a voltage dividing potentiometer P is connected across the conductors 16 and 17 at 29 and 30 and is adjusted to effect a drop in voltage whereby twenty volts are applied across the points 19 and 25 in the conductors (Figure 5). The changes in the lamp voltage and this applied voltage will always be directly proportional whereby the apparatus can be used over a wide range of supply voltages without completely redesigning the same for each installation having a different available supply voltage.

In Figure 6, the circuit shown in Figure 1 is illustrated in connection with apparatus of the obscuration type, it being understood that the circuits shown in Figures 2 to 5 may likewise be used in connection with such apparatus. Instead of utilizing the cell PE to detect light reflected from matter in the fluid stream, the light beam L is directed onto the light sensitive element of the cell and changes in the condition of the fluid stream effect the degree of obscurement of the light beam whereby the circuit is unbalanced to effect operation of the galvanometer G or the like.

This type of apparatus is particularly adaptable for detecting the presence of suspended matter in air or other gases, for example, smoke or dust particles which upon being present in the fluid stream darken or obscure the light beam. The apparatus is also adaptable where it is desired to detect changes in color or opacity of liquids for the purpose of maintaining a uniform product.

From the foregoing description, it will be seen that the present invention provides simple and practical detecting apparatus of the character indicated herein which eliminates the necessity of balanced cell circuits wherein matching cells are required, this being accomplished by maintaining the lamp and cell output in balance irrespective of supply voltage fluctuations and ambient temperature changes. The apparatus has great utility in a wide variety of applications of great importance in the marine, aircraft and industrial fields.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In apparatus of the class described, the combination of a source of electrical energy, a light source connected across said energy source for providing a beam of light, means for conducting a stream of fluid into the light beam, a photoelectric element located with respect to the light beam and the fluid stream to detect matter in the fluid stream, one terminal of said photoelectric element being in electrical connection with one terminal of said energy source, a varistor element having one terminal in electrical connection with the other terminal of said energy source and having its other terminal in electrical connection with the other terminal of said photoelectric element, and electro-responsive means connected across the terminals of said photoelectric element, said varistor and photoelectric elements being so constructed to normally cause substantially equal and opposite currents to pass through said electro-responsive means.

2. Apparatus according to claim 1, wherein resistance means are electrically connected between one terminal of said varistor element and one terminal of said photoelectric element to equalize the currents passing through said electro-responsive means.

3. In apparatus of the class described, the combination of a source of electrical energy, a light source connected across said energy source for providing a beam of light, means for conducting a stream of fluid into the light beam, a photoelectric element located with respect to the light beam and the fluid stream to detect matter in the fluid stream, a varistor element and resistance means connected in series across said energy source, said photoelectric element being electrically connected across the terminals of said resistance means, and electro-responsive means connected across the terminals of said photoelectric element.

4. Apparatus according to claim 3, wherein second resistance means is connected between one terminal of said first mentioned resistance means and one terminal of said photoelectric element.

5. Apparatus according to claim 3, wherein second resistance means is connected between one terminal of said first mentioned resistance means and one terminal of said photoelectric element, one of said resistance means being adjustable to vary the resistance thereof.

6. Apparatus according to claim 3, wherein said resistance means has a fixed resistance value, a second resistance means is electrically connected at a point between said varistor element and said first mentioned resistance means and to one terminal of said photoelectric element, and said last mentioned resistance means is adjustable to vary the resistance thereof.

7. Apparatus according to claim 3, wherein said resistance means include a thermistor element and a fixed resistance element shunted across the terminals of said thermistor element.

8. Apparatus according to claim 3, wherein said resistance means include a plurality of thermistor elements connected in series and a fixed resistance element for each thermistor element shunted across the terminals thereof.

9. Apparatus according to claim 3, wherein said resistance means include a plurality of thermistor elements and a fixed resistance element connected in series and a fixed resistance element for each thermistor element shunted across the terminals thereof.

10. In apparatus of the class described, the combination of a source of electrical energy, a light source connected across said energy source for providing a beam of light, means for conducting a stream of fluid into the light beam, a photoelectric element located with respect to the light beam and the fluid stream to detect matter in the fluid stream, a varistor element having one terminal connected to one terminal of said energy source, a plurality of thermistor elements and a fixed resistor connected in series between the other terminal of said varistor element and the other terminal of said energy source, a fixed resistance element for each thermistor element shunted across the terminals thereof, said photoelectric element having one terminal thereof in electrical connection with said other terminal of said energy source, an adjustable variable resistance element electrically connected between said other terminal of said varistor element and the other terminal of said photoelectric element, and electro-responsive means connected across the terminals of said photoelectric element.

CHESTER E. MARTINE.

REFERENCES CITED

The following references are of record in the file of this patent:

UNITED STATES PATENTS

| Number | Name | Date |
| --- | --- | --- |
| 1,094,733 | Lyle | Apr. 28, 1914 |
| 1,878,891 | Robinson | Sept. 20, 1932 |
| 2,152,016 | Baesecke et al. | Mar. 28, 1939 |